United States Patent
Arima

(10) Patent No.: US 10,730,712 B2
(45) Date of Patent: Aug. 4, 2020

(54) CONVEYANCE APPARATUS, READING APPARATUS, IMAGE FORMING APPARATUS AND IMAGE FORMING SYSTEM

(71) Applicant: CANON KABUSHIKI KAISHA, Tokyo (JP)

(72) Inventor: Makoto Arima, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 15/855,345

(22) Filed: Dec. 27, 2017

(65) Prior Publication Data

US 2018/0194580 A1 Jul. 12, 2018

(30) Foreign Application Priority Data

Jan. 6, 2017 (JP) .................................. 2017-000875

(51) Int. Cl.
*B65H 7/12* (2006.01)
*G01N 29/11* (2006.01)
(Continued)

(52) U.S. Cl.
CPC ............. *B65H 7/125* (2013.01); *G01N 29/11* (2013.01); *G01N 29/4427* (2013.01);
(Continued)

(58) Field of Classification Search
CPC . B65H 7/125; G01N 29/11; G01N 2291/0237
(Continued)

(56) References Cited

U.S. PATENT DOCUMENTS 6,913,259 B2 * 7/2005 Phinney ................. B65H 7/125
271/259
7,025,348 B2 * 4/2006 Phinney ................. B65H 7/125
271/262
(Continued)

FOREIGN PATENT DOCUMENTS

JP 2004-231403 A 8/2004
JP 2012-188177 A 10/2012
JP 2016-204065 A 12/2016

OTHER PUBLICATIONS

Japanese Office Action dated Dec. 4, 2018, issued in Japanese Patent Application No. 2017-000875.

*Primary Examiner* — Natalie Huls
*Assistant Examiner* — Monica S Young
(74) *Attorney, Agent, or Firm* — Venable LLP

(57) ABSTRACT

A conveyance apparatus is capable of detecting the presence or absence of multi feeding with high accuracy even when a received waveform varies due to a "noise from the circuit" and an "influence due to vibrations," which are fixedly generated noise components. The conveyance apparatus includes an original conveying motor configured to convey an original; an ultrasonic transmitter, which is arranged at one of positions sandwiching a conveyance path along which the original is conveyed, and transmits an ultrasonic wave toward the conveyance path; and an ultrasonic receiver, which is arranged at the other one of the positions sandwiching the conveyance path, and receives the ultrasonic wave transmitted from the ultrasonic transmitter. The conveyance apparatus compares a received wave amplitude exhibited with sheet-presence against a threshold value determined based on a received wave amplitude exhibited with sheet-absence to determine whether the original is conveyed with multi feeding.

5 Claims, 12 Drawing Sheets

(51) Int. Cl.
*G01N 29/44* (2006.01)
*G01N 29/48* (2006.01)

(52) U.S. Cl.
CPC ...... *G01N 29/48* (2013.01); *B65H 2404/6111* (2013.01); *B65H 2553/30* (2013.01); *B65H 2557/61* (2013.01); *B65H 2601/521* (2013.01); *B65H 2801/06* (2013.01); *B65H 2801/39* (2013.01); *G01N 2291/015* (2013.01); *G01N 2291/0237* (2013.01)

(58) Field of Classification Search
USPC .......................................................... 73/600
See application file for complete search history.

(56) References Cited

U.S. PATENT DOCUMENTS

| | | | |
|---|---|---|---|
| 7,130,245 B2 | 10/2006 | Okitsu et al. | |
| 7,275,438 B2* | 10/2007 | Focke | B65B 57/04 250/559.12 |
| 8,531,742 B2* | 9/2013 | Tanaka | B65H 3/063 271/110 |
| 2004/0070142 A1* | 4/2004 | Kawasaki | B65H 7/12 271/262 |
| 2004/0150155 A1* | 8/2004 | Okitsu | B65H 7/125 271/262 |
| 2007/0057768 A1* | 3/2007 | Zeng | H04L 63/0492 340/10.1 |
| 2014/0091516 A1* | 4/2014 | Okitsu | B65H 7/125 271/262 |
| 2015/0048566 A1* | 2/2015 | Utagawa | B65H 1/14 271/10.02 |
| 2016/0194168 A1* | 7/2016 | Kato | B65H 7/125 271/265.02 |

* cited by examiner

| SAMPLE POINT | A/D-CONVERTED VALUE | | | | | | | | AVERAGE VALUE |
|---|---|---|---|---|---|---|---|---|---|
| | 1ST TIME | 2ND TIME | 3RD TIME | 4TH TIME | 5TH TIME | 6TH TIME | 7TH TIME | 8TH TIME | |
| A | A[1] | A[2] | A[3] | A[4] | A[5] | A[6] | A[7] | A[8] | A[ave] |
| B | B[1] | B[2] | B[3] | B[4] | B[5] | B[6] | B[7] | B[8] | B[ave] |
| C | C[1] | C[2] | C[3] | C[4] | C[5] | C[6] | C[7] | C[8] | C[ave] |
| D | D[1] | D[2] | D[3] | D[4] | D[5] | D[6] | D[7] | D[8] | D[ave] |
| E | E[1] | E[2] | E[3] | E[4] | E[5] | E[6] | E[7] | E[8] | E[ave] |
| F | F[1] | F[2] | F[3] | F[4] | F[5] | F[6] | F[7] | F[8] | F[ave] |
| G | G[1] | G[2] | G[3] | G[4] | G[5] | G[6] | G[7] | G[8] | G[ave] |
| H | H[1] | H[2] | H[3] | H[4] | H[5] | H[6] | H[7] | H[8] | H[ave] |

FIG. 10

RECEIVED WAVE WITH TRANSMITTING ULTRASONIC WAVE

RECEIVED WAVE WITH NO TRANSMITTING ULTRASONIC WAVE

CONVEYANCE APPARATUS, READING APPARATUS, IMAGE FORMING APPARATUS AND IMAGE FORMING SYSTEM

BACKGROUND OF THE INVENTION

Field of the Invention

The present invention relates to a technology for detecting sheets being conveyed in an overlapped state.

Description of the Related Art

Some conveyance apparatus configured to convey an original or other such sheet have a function of detecting sheets being conveyed in an overlapped state. As means for detecting the sheets in an overlapped state, there are provided, for example, an ultrasonic transmitting portion configured to transmit an ultrasonic wave so as to sandwich a conveyance path of the sheet and an ultrasonic receiving portion configured to receive the ultrasonic wave.

In addition, a difference in attenuation amount of the ultrasonic wave between a case in which one sheet has been fed to be conveyed (hereinafter referred to as "single feeding") and a case in which a plurality of sheets have been fed to be conveyed in an overlapped state (hereinafter referred to as "multi feeding") is detected. In this manner, it is determined whether or not the sheet being conveyed is in a multi fed state by, for example, detecting the attenuation amount based on an amplitude level of a received wave.

The detection accuracy of the above-mentioned multi feeding detection may be influenced by variations including "variations in sensitivity of a single ultrasonic sensor", an "ambient temperature around the ultrasonic sensor exhibited at a time of detection", "relative mechanical positions of the receiving portion and the transmitting portion exhibited at the time of the detection", and "variations of an amplitude detection circuit for the received wave". For example, even when sheets of the same kind are conveyed, the amplitude level of the received wave may vary each time a sheet is conveyed, with the result that it sometimes cannot be correctly determined whether or not sheets have been multi fed.

In view of such a problem, the apparatus disclosed in Japanese Patent Application Laid-open No. 2012-188177 and U.S. Pat. No. 7,130,245 B2 are configured to transmit an ultrasonic wave from a transmitting portion with no sheet being present between an ultrasonic transmitting portion and an ultrasonic receiving portion. In those apparatus, the reception level of an amplifier circuit and the transmission characteristic of the transmitting portion are adjusted based on the amplitude level of the received wave detected by the receiving portion when the ultrasonic wave is transmitted.

With this configuration, it is possible to correctly detect whether or not sheets have been multi fed even when there are variations corresponding to the "variations in sensitivity of the ultrasonic sensor", the "ambient temperature around the ultrasonic sensor", and the "relative mechanical positions of the receiving portion and the transmitting portion".

However, in the apparatus disclosed in Japanese Patent Application Laid-open No. 2012-188177 and U.S. Pat. No. 7,130,245 B2, it is not possible to sufficiently handle variations including: individual variations in "noise from a circuit" and "influence due to vibrations" being noise components that are fixedly generated at all times; and variations in reception level caused by the environmental change or aging of the apparatus.

An output amplitude of the ultrasonic receiving portion is minute, and hence the amplitude detection circuit detects the amplitude with a large amplification degree. Consequently, minute extrinsic noises including the "noise from the circuit" and the "influence due to vibrations" are also amplified, which exerts an adverse influence on a result of the detection.

For example, the "noise from the circuit" mainly derives from a background noise of the amplifier circuit or a power supply noise, and the "influence due to vibrations" derives from the driving of an actuator arranged in the same system. The influence due to the driving of the actuator is an influence due to the fact that vibration components of the driving of the actuator include a resonance frequency component of the ultrasonic sensor.

In this manner, in the related art, a detection including an error of the fixedly generated noise components is performed. This leads to a problem that the detection accuracy for the presence or absence of the multi feeding deteriorates.

The present invention has a main object to provide a conveyance apparatus capable of detecting the presence or absence of the multi feeding with high accuracy even when variations in received waveform occur due to the "noise from the circuit" and the "influence due to vibrations" being the fixedly generated noise components.

SUMMARY OF THE INVENTION

A conveyance apparatus according to the present invention includes a conveyer configured to convey a sheet; an ultrasonic transmitter, which is arranged at one of positions sandwiching a conveyance path along which the sheet is conveyed, and is configured to transmit an ultrasonic wave toward the conveyance path; an ultrasonic receiver, which is arranged at another one of the positions sandwiching the conveyance path, and is configured to receive the ultrasonic wave transmitted from the ultrasonic oscillator; and a determination unit configured to compare a signal received by the ultrasonic receiver with the sheet being present between the ultrasonic transmitter and the ultrasonic receiver and with the ultrasonic wave being transmitted by the ultrasonic transmitter against a threshold value determined based on a signal received and output by the ultrasonic receiver with the sheet not being present between the ultrasonic transmitter and the ultrasonic receiver and with the ultrasonic wave not being transmitted by the ultrasonic transmitter, to determine based on a result of the comparison whether or not the sheet is being subjected to multi feeding.

Further features of the present invention will become apparent from the following description of exemplary embodiments (with reference to the attached drawings).

BRIEF DESCRIPTION OF THE DRAWINGS

FIG. 10 is a table for showing an example of a method of calculating a voltage value of each of sample points obtained by sampling the received wave a plurality of times.

DESCRIPTION OF THE EMBODIMENTS

Now, a description is given of an exemplary case in which the present invention is applied to an image forming system including a conveyance apparatus (for example, auto document feeder (ADF) or automatic original feeding device) configured to convey an original or other such sheet.

The technical scope of the present invention is defined by the scope of claims, and is not limited by individual embodiments described below. Further, each embodiment is described by taking an exemplary case in which multi feeding of originals being sheets is to be detected, but the present invention may also be applied to the detection of the multi feeding of, for example, recording mediums (for example, paper sheets) on which a recording image is to be formed.

First Embodiment

Example of Overall Configuration of Apparatus

Figure 1:
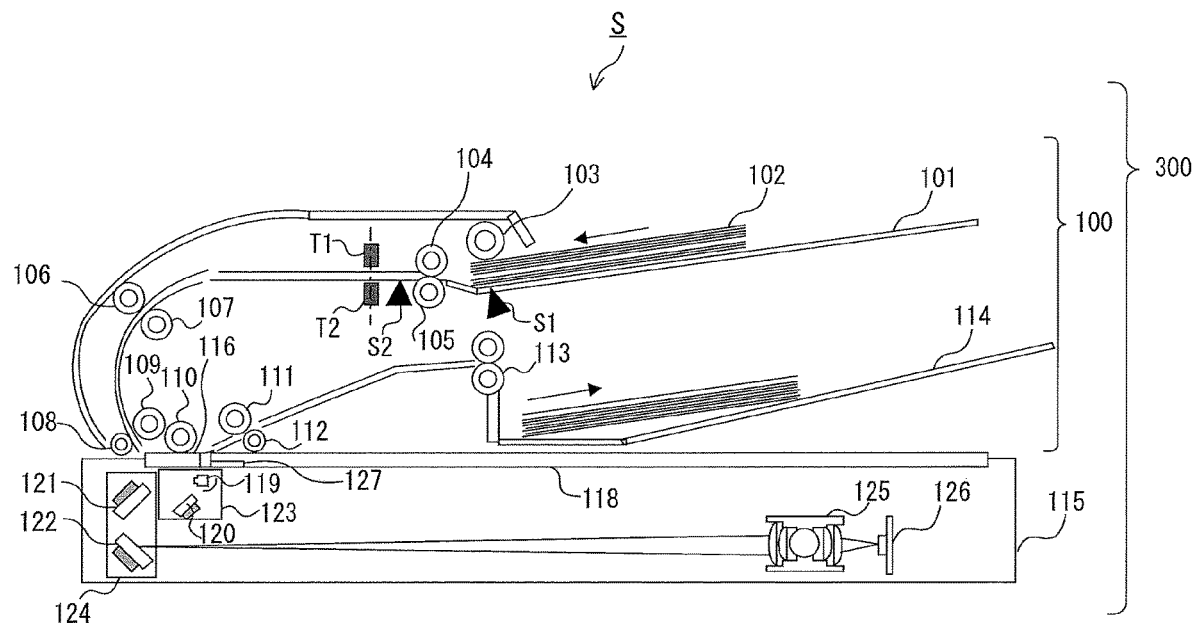
FIG. 1 is a schematic vertical sectional view for illustrating an example of a configuration of an image forming system according to a first embodiment of the present invention.
Figure 1:
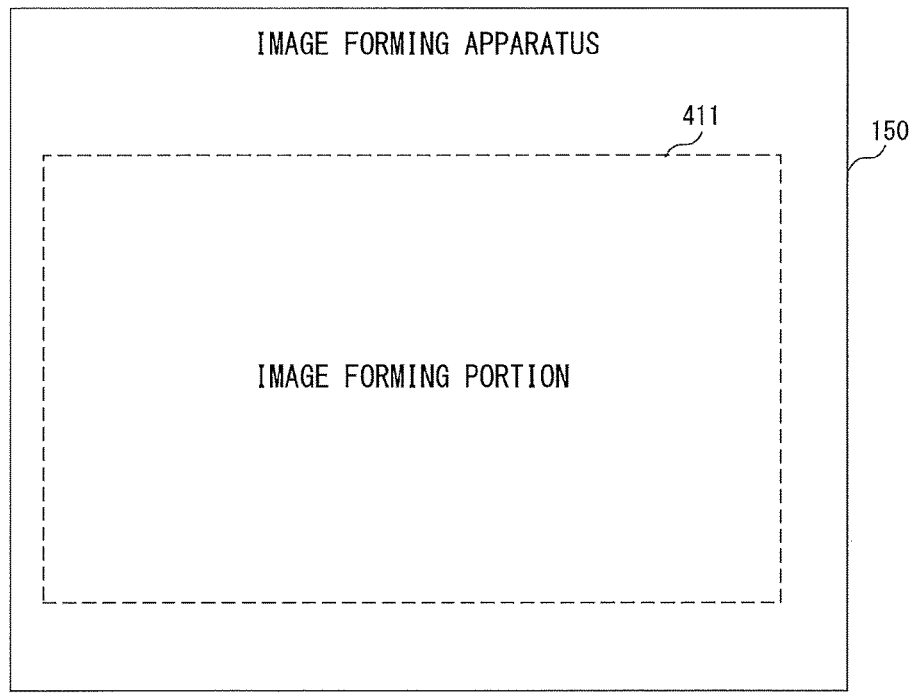

FIG. 1 is a schematic vertical sectional view for illustrating an example of a configuration of an image forming system according to a first embodiment of the present invention.

An image formation system S includes: a reading apparatus 300 including a conveyance apparatus 100 configured to convey an original or other such sheet and an image reader 115 configured to read image information on the sheet conveyed by the conveyance apparatus 100; and an image forming apparatus 150.

The image forming apparatus 150 illustrated in FIG. 1 includes an image forming unit 411 configured to form an image by a known electrophotographic printing method. The image forming unit 411 includes a photosensitive member, an exposure device, a developing device, a transfer unit, and a fixing device.

The exposure device is configured to form an electrostatic latent image on the photosensitive member based on read data (image data) generated by the reading apparatus 300 reading an original 102.

The developing device is configured to form a developer image on the photosensitive member by developing the electrostatic latent image formed on the photosensitive member by a developer. The transfer unit is configured to transfer the developer image formed on the photosensitive member onto a given recording medium (for example, a sheet of paper). The fixing device is configured to fix the developer image transferred onto the recording medium to the recording medium. With the above mentioned configuration, the image forming unit 411 forms an image corresponding to the image data on the recording medium.

The originals 102 are stacked on an original tray 101 included in the conveyance apparatus 100. A tray original presence/absence sensor S1 is also provided for the original tray 101. The tray original presence/absence sensor S1 detects whether or not the originals 102 are stacked at a position at which the originals 102 can be fed.

A sheet feeding roller 103 is provided downstream of the original tray 101. The sheet feeding roller 103 is connected to the same drive source as that of a separating/conveying roller 104, and is rotated in conjunction with the rotation of the drive source to feed the original 102.

The sheet feeding roller 103 is configured to be normally retracted into an upper position being a home position so as not to inhibit work of setting an original. When a sheet feeding operation is started, the sheet feeding roller 103 is lowered to be brought into abutment with the upper surface of the original 102. The sheet feeding roller 103 has an axis supported by an arm (not shown), and is vertically moved in conjunction with the swinging of the arm.

A separating/conveying driven roller 105 is arranged on an opposing side of the separating/conveying roller 104, and is pressed against the separating/conveying roller 104.

The separating/conveying driven roller 105 is formed of a rubber material or the like having a slightly smaller coefficient of friction than that of the material of the separating/conveying roller 104, and feeds the originals 102, which have been fed by the sheet feeding roller 103, separately one by one in cooperation with the separating/conveying roller 104.

A separation sensor S2 detects a timing at which the leading edge of the original 102 reaches the separating/conveying driven roller 105 and the separating/conveying roller 104.

An ultrasonic transmitting sensor T1 transmits an ultrasonic wave toward the original 102 passing along an original conveyance path sandwiched between the ultrasonic transmitting sensor T1 and an ultrasonic receiving sensor T2, and the ultrasonic receiving sensor T2 receives the ultrasonic wave transmitted by the ultrasonic transmitting sensor T1. With this configuration, it is detected whether or not the originals 102 are being conveyed in an overlapped state (being multi fed). Details thereof are described later.

A registration roller 106 and a driven roller 107 register the leading edge of the original, which has been fed. Specifically, the leading edge of the separated original is brought into abutment with a nip portion between the registration roller 106 and the driven roller 107, which are in a stationary state, to cause the original to bend, to thereby adjust skew feeding of the original at the leading edge.

A lead roller 108 and a lead driven roller 109 convey the original toward a reading glass 116. A platen guide 110 is arranged on an opposing side of the reading glass 116.

Image information on a surface of the original 102 passing through above the reading glass 116 is read by the image reader 115. Specifically, the image information is acquired through a charge coupled device (CCD) 126 being an example of a line sensor included in the image reader 115.

After that, a lead delivery roller 111 and a lead delivery driven roller 112 convey the original subjected to the reading toward delivery rollers 113. The delivery rollers 113 deliver the original onto a delivery tray 114. The following description is directed to a configuration of the image reader 115 configured to acquire the image information on the original 102.

The image reader 115 includes: a lamp 119 configured to apply light to an original surface to be read; and mirrors 120, 121, and 122 configured to guide the reflected light from the original 102 to a lens 125 and the CCD 126.

The lamp 119 and the mirror 120 are mounted to a first mirror base 123. The mirrors 121 and 122 are mounted to a second mirror base 124.

The mirror bases 123 and 124 are each coupled to a drive motor (not shown) through a wire (not shown), and are moved in parallel with a platen glass 118 by the rotation driving of the drive motor.

A reference white plate 127 being a reference of a reading luminance is mounted to an end portion of the platen glass 118. The reflected light from the original is guided to the lens 125 through the mirrors 120, 121, and 122 to be imaged at a light receiving portion of the CCD 126 by the lens 125. The CCD 126 photoelectrically converts the reflected light, which has been imaged, received by a light receiving element, and outputs an electric signal corresponding to an incident light amount. In this manner, the image information on the original is acquired.

Figure 2:
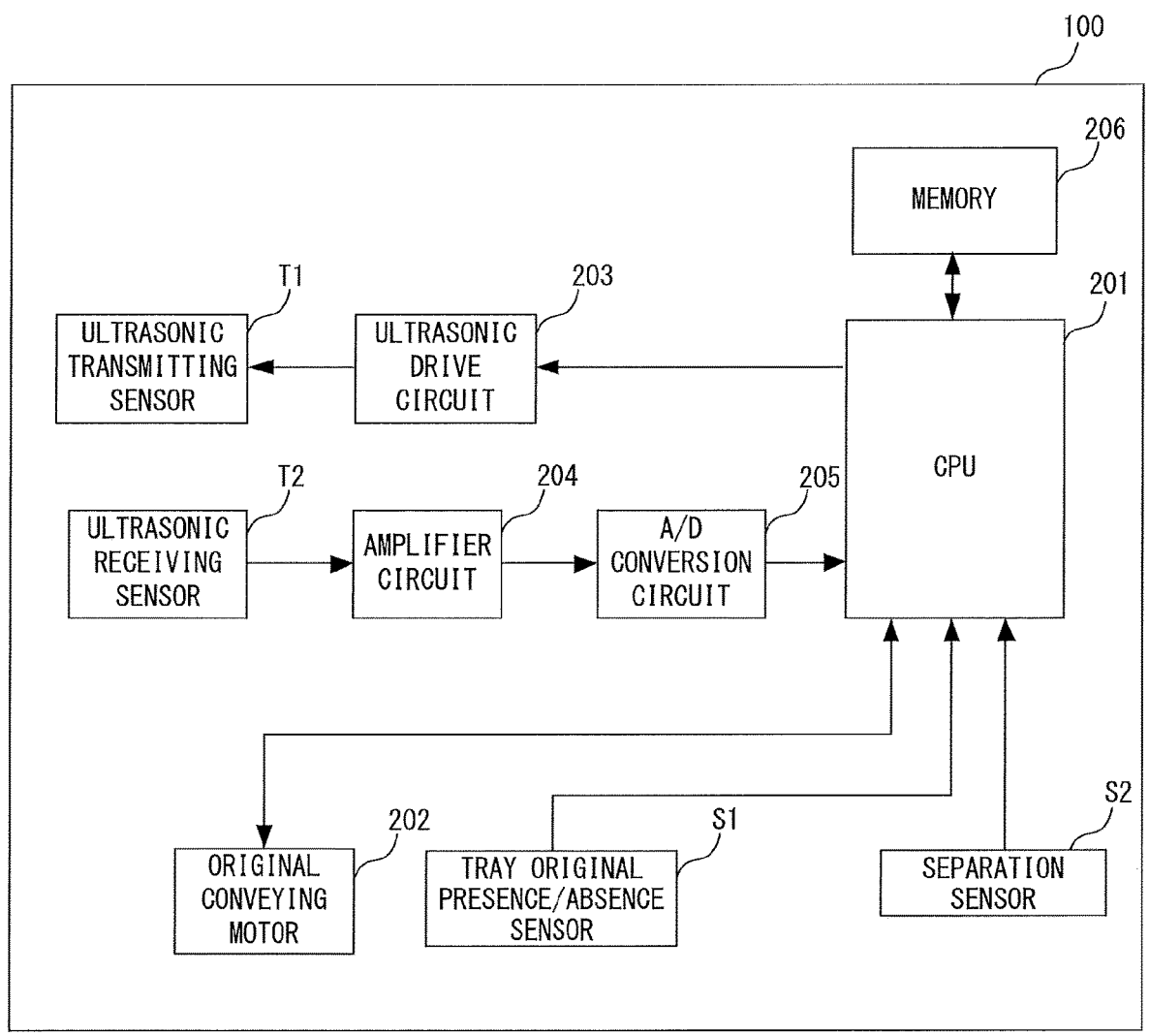
FIG. 2 is a block diagram for illustrating an example of a functional configuration of a conveyance apparatus.

FIG. 2 is a block diagram for illustrating an example of a functional configuration of the conveyance apparatus 100.

The conveyance apparatus 100 includes a central processing unit (CPU) 201, an original conveying motor 202, an ultrasonic drive circuit 203, an amplifier circuit 204, an A/D conversion circuit 205, the ultrasonic transmitting sensor T1, the ultrasonic receiving sensor T2, the tray original presence/absence sensor S1, and the separation sensor S2.

The CPU 201 functions as a controller configured to control an operation of the conveyance apparatus 100.

The CPU 201 also performs the detection of sensor output of the tray original presence/absence sensor S1 and the separation sensor S2, the control of the ultrasonic transmitting sensor T1, the ultrasonic receiving sensor T2, and the like, the control of an A/D conversion timing of the A/D conversion circuit 205, and the like.

The original conveying motor 202 drives each of the conveying rollers included in the conveyance apparatus 100.

The ultrasonic drive circuit 203 receives, from the CPU 201, a pulse signal having a frequency (for example, 300 kHz) close to a resonance frequency of the ultrasonic transmitting sensor T1 and the ultrasonic receiving sensor T2, and converts the voltage of the pulse signal so as to become a voltage required for driving the ultrasonic transmitting sensor T1. That is, the ultrasonic drive circuit 203 generates a pulse signal for driving the ultrasonic transmitting sensor T1.

The ultrasonic transmitting sensor T1 receives the pulse signal output by the ultrasonic drive circuit 203, and transmits an ultrasonic wave toward the ultrasonic receiving sensor T2.

The ultrasonic receiving sensor T2 receives the ultrasonic wave transmitted by the ultrasonic transmitting sensor T1, converts the signal of the received ultrasonic wave into an electric signal, and outputs the electric signal to the amplifier circuit 204.

The amplifier circuit 204 amplifies (amplifies the voltage of) the signal received from the ultrasonic receiving sensor T2, and outputs the amplified signal.

The A/D conversion circuit 205 converts the received analog signal, which has been amplified by the amplifier circuit 204, into a digital signal based on an A/D conversion timing instruction signal output from the CPU 201. A result of the conversion is output to the CPU 201.

The CPU 201 calculates an amplitude level of a received wave (received wave amplitude) based on the received signal, which has been subjected to the A/D conversion and output by the A/D conversion circuit 205. It is detected whether or not originals are being multi fed based on a result of the calculation. The memory 206 functions as a storage unit configured to store various kinds of data.

Figure 3:
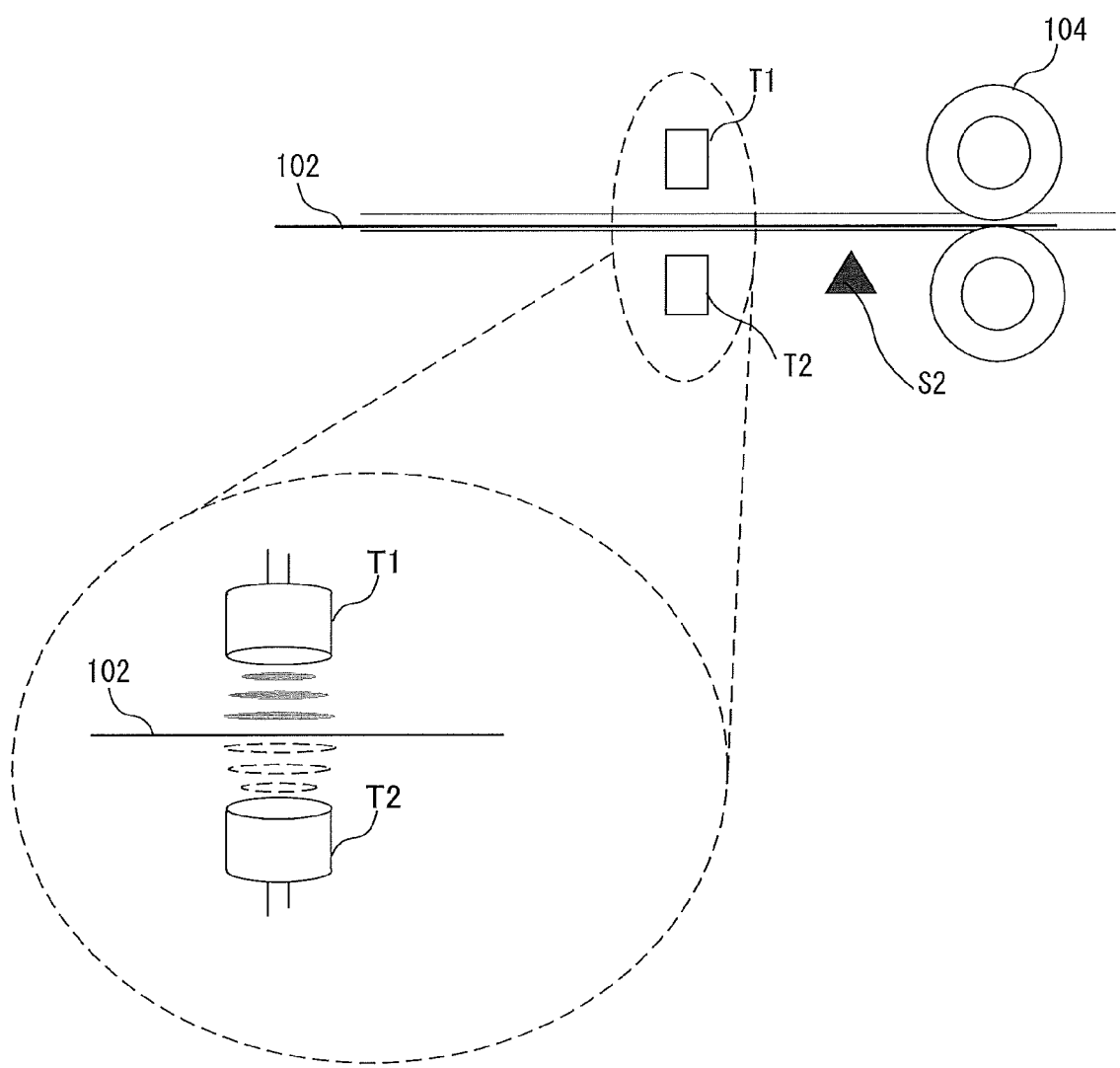
FIG. 3 is a partially enlarged view for illustrating an arrangement relationship between an ultrasonic transmitting sensor and an ultrasonic receiving sensor.}

FIG. 3 is a partially enlarged view for illustrating an arrangement relationship between the ultrasonic transmitting sensor T1 and the ultrasonic receiving sensor T2.

As illustrated in FIG. 3, the ultrasonic transmitting sensor T1 is arranged at one of positions sandwiching the conveyance path along which the original 102 is conveyed, and transmits the ultrasonic wave toward the conveyance path. The ultrasonic receiving sensor T2 is arranged at the other one of the positions sandwiching the conveyance path, and receives the ultrasonic wave transmitted from the ultrasonic transmitting sensor T1. In this manner, the ultrasonic transmitting sensor T1 and the ultrasonic receiving sensor T2 are arranged at the respective positions.

The ultrasonic wave transmitted from the ultrasonic transmitting sensor T1 is propagated toward the ultrasonic receiving sensor T2 through the original 102 on the original conveyance path, and the propagated ultrasonic wave is received by the ultrasonic receiving sensor T2. The ultrasonic wave (received signal) received by the ultrasonic receiving sensor T2 has its intensity converted into a voltage amplitude. Then, a result of the conversion is amplified through the amplifier circuit 204, and is converted into a digital value through the A/D conversion circuit 205.

Figure 4A:
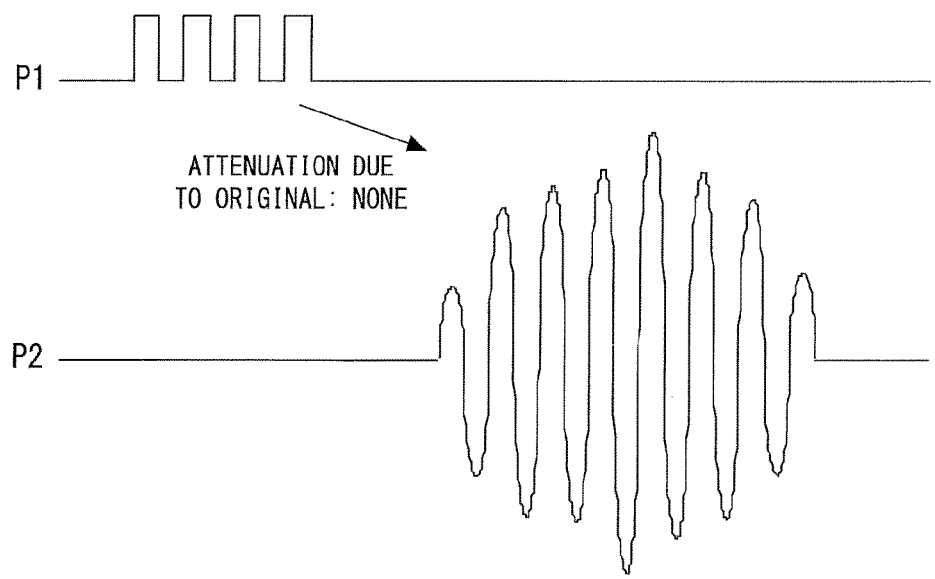
FIG. 4A, FIG. 4B, and FIG. 4C are diagrams for illustrating an outline of a method of identifying single feeding or multi feeding of an original through use of an ultrasonic sensor.
Figure 4B:
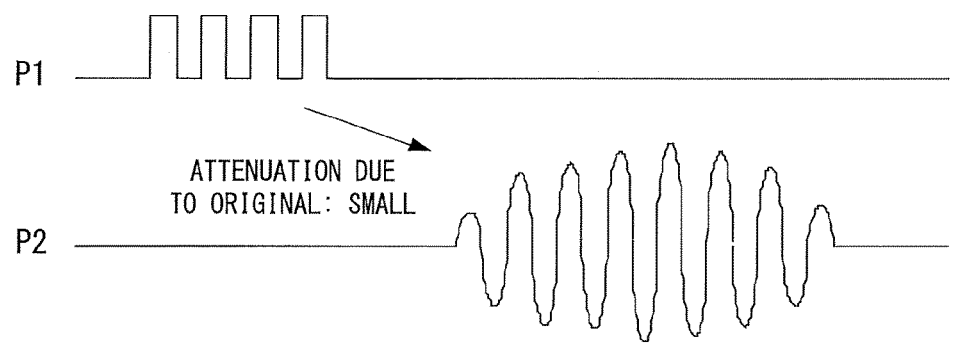
Figure 4C:
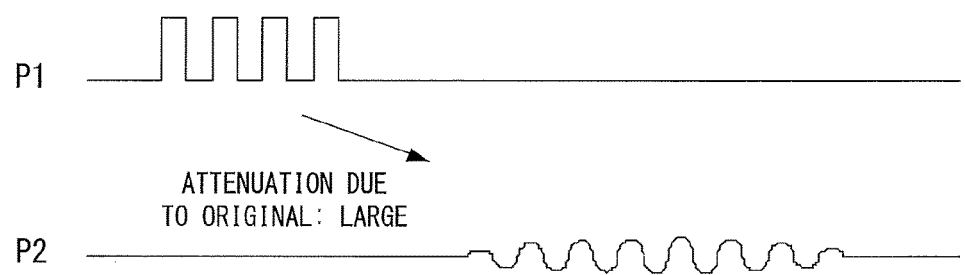

FIG. 4A to FIG. 4C are diagrams for illustrating an outline of a method of identifying single feeding or multi feeding of the original 102 through use of an ultrasonic sensor.

In FIG. 4A to FIG. 4C, "P1" represents a pulse signal received from the ultrasonic drive circuit 203 by the ultrasonic transmitting sensor T1, and "P2" represents a waveform of a signal output by converting the ultrasonic wave received by the ultrasonic receiving sensor T2 into an electric signal. The pulse signal received from the ultrasonic drive circuit 203 by the ultrasonic transmitting sensor T1 is the same in FIG. 4A to FIG. 4C.

FIG. 4A is an illustration of a waveform of a transmitted or received signal of each of the ultrasonic transmitting sensor T1 and the ultrasonic receiving sensor T2, which is exhibited with no original being present therebetween.

FIG. 4B is an illustration of a waveform of a transmitted or received signal of the ultrasonic transmitting sensor T1 and the ultrasonic receiving sensor T2, which is exhibited with one original being present therebetween (single feeding state).

FIG. 4C is an illustration of a waveform of a transmitted or received signal of the ultrasonic transmitting sensor T1 and the ultrasonic receiving sensor T2, which is exhibited with two originals being present therebetween (multi feeding state).

A lag in the timing of the output of the ultrasonic receiving sensor T2 with respect to the input of the ultrasonic transmitting sensor T1 indicates an arrival time period of the ultrasonic wave that elapses after the ultrasonic transmitting sensor T1 transmits an ultrasonic wave until the ultrasonic receiving sensor T2 receives the ultrasonic wave.

For example, with the original 102 not being present between the ultrasonic transmitting sensor T1 and the ultrasonic receiving sensor T2 as illustrated in FIG. 4A, an amplitude of the ultrasonic wave is not attenuated (attenuation due to the original: none). In contrast, with one original 102 being present between the ultrasonic transmitting sensor T1 and the ultrasonic receiving sensor T2 as illustrated in FIG. 4B, it is indicated that the amplitude of the ultrasonic wave is attenuated relatively largely when the ultrasonic wave passes through the original 102 (attenuation due to the original: small).

With a plurality of originals 102 being present between the ultrasonic transmitting sensor T1 and the ultrasonic receiving sensor T2 as illustrated in FIG. 4C, the large attenuation occurs a plurality of times, and hence it is indicated that the amplitude of the ultrasonic wave that has passed through the plurality of originals is attenuated further more largely (attenuation due to the originals: large) than when one original is present.

That is, there occurs a difference between the amplitude of the received wave at a time of the "single feeding" of the original 102 and the amplitude of the received wave at a time of the "multi feeding" of the originals 102. For example, the amplitude at the time of the "multi feeding" is relatively smaller, and hence it is possible to determine based on the difference whether or not the multi feeding is being performed.

In general, the attenuation amount of the ultrasonic wave differs depending on the thickness or kind of the original, but a difference in attenuation amount due to the number of originals (one or plural) is by far larger than a variation in attenuation amount due to the thickness or kind of the original. Therefore, it is possible to detect whether or not the multi feeding is being performed regardless of the thickness or kind of the original.

Figure 5:
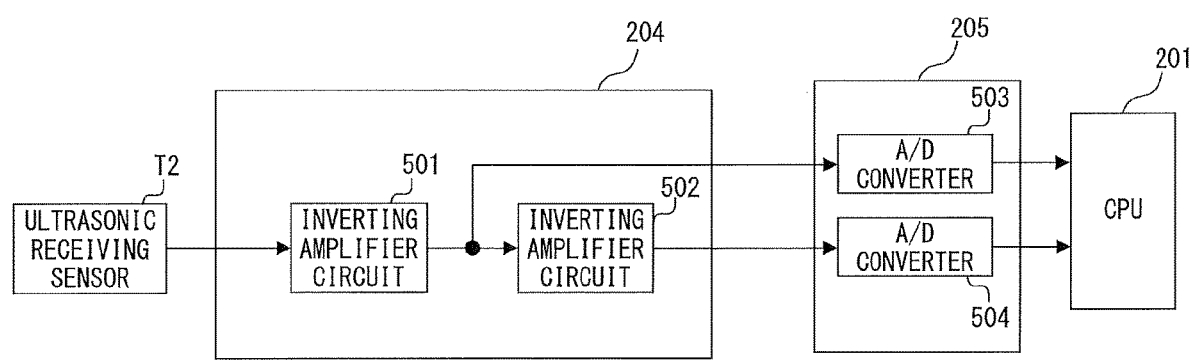
FIG. 5 is a diagram for illustrating an example of configurations of an amplifier circuit and an A/D conversion circuit.

FIG. 5 is a diagram for illustrating an example of configurations of the amplifier circuit 204 and the A/D conversion circuit 205.

The amplifier circuit 204 is formed of a plurality of stages of amplifier circuits in order to greatly amplify a minute signal received from the ultrasonic receiving sensor T2.

For example, the amplifier circuit 204 includes inverting amplifier circuits 501 and 502. The A/D conversion circuit 205 includes A/D converters 503 and 504.

The output of the inverting amplifier circuit 501 is input to the A/D converter 503. The output of the inverting amplifier circuit 502 is input to the A/D converter 504.

The above-mentioned attenuation amount of the ultrasonic wave is subject to changes due to influences including "variations in sensitivity of the ultrasonic sensor", an "ambient temperature around the ultrasonic sensor", and "relative mechanical positions of the receiving sensor and the transmitting sensor". In the same manner, the arrival time period of the ultrasonic wave is also changed. Therefore, in the conveyance apparatus 100 according to the first embodiment, the detection using the ultrasonic sensor "with no original being present" is performed in order to reduce the influences due to such changes.

As described above, in the detection using the ultrasonic sensor, the attenuation amount of the ultrasonic wave greatly differs between the case "with no original being present" between an ultrasonic transmitting sensor and an ultrasonic receiving sensor and the case "with an original being present" therebetween. Therefore, when the received wave is to be measured with the same amplification factor, one of the signals is saturated or has the amplitude too small, and hence it is not possible to correctly measure the received wave.

The saturation of the signal refers to a state under which the amplitude is too large to fall within an output voltage range of the amplifier circuit 204 or to fall within an input voltage range of the A/D conversion circuit 205. The amplitude of the signal being too small refers to a state under which the amplitude is so small as to be buried in a background noise.

The detection using the ultrasonic sensor "with no original being present" is desired to be performed before the passing of the original. This is because the "ambient temperature around the ultrasonic sensor" and the "relative mechanical positions of the receiving sensor and the transmitting sensor" are substantially the same between the detection before the passing of the original and the detection at a time of the passing of the original.

FIG. 6A to 6D are diagrams for illustrating an example of functions of the amplifier circuit 204 and the A/D conversion circuit 205.

Figure 6A:
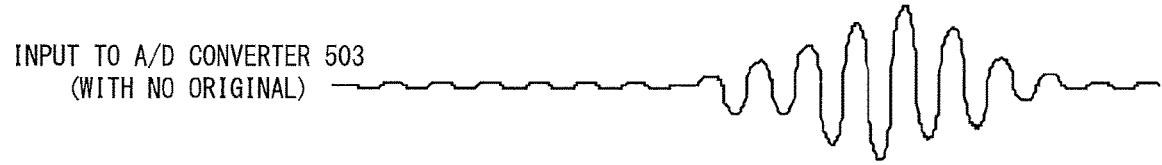
FIG. 6A, FIG. 6B, FIG. 6C, and FIG. 6D are diagrams for illustrating an example of functions of the amplifier circuit and the A/D conversion circuit.

FIG. 6A is an illustration of a waveform of an input signal to the A/D converter 503 obtained when the ultrasonic wave is transmitted from the ultrasonic transmitting sensor T1 with no original being present between the ultrasonic transmitting sensor T1 and the ultrasonic receiving sensor T2.

Figure 6B:
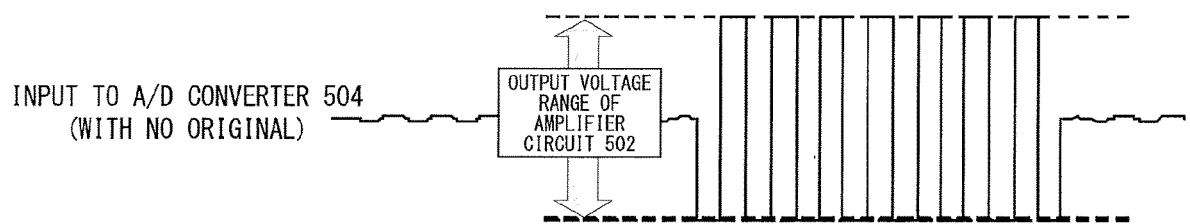

FIG. 6B is an illustration of a waveform of an input signal to the A/D converter 504 obtained when the ultrasonic wave is transmitted from the ultrasonic transmitting sensor T1 with no original being present between the ultrasonic transmitting sensor T1 and the ultrasonic receiving sensor T2.

Figure 6C:
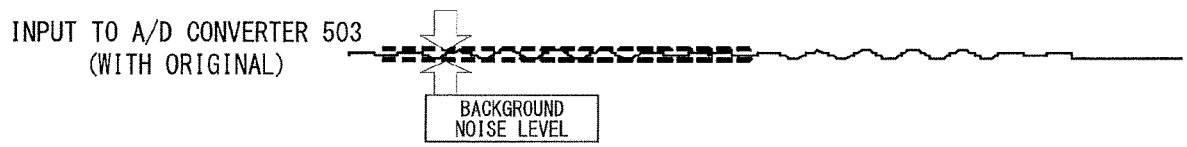

FIG. 6C is an illustration of a waveform of an input signal to the A/D converter 503 obtained when the ultrasonic wave is transmitted from the ultrasonic transmitting sensor T1 with an original being present between the ultrasonic transmitting sensor T1 and the ultrasonic receiving sensor T2.

Figure 6D:
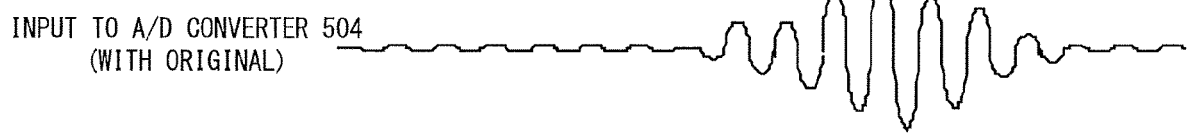

FIG. 6D is an illustration of a waveform of an input signal to the A/D converter 504 obtained when the ultrasonic wave is transmitted from the ultrasonic transmitting sensor T1 with an original being present between the ultrasonic transmitting sensor T1 and the ultrasonic receiving sensor T2.

For example, in the case illustrated in FIG. 6B, the amplification is performed through the circuits having a large amplification factor (inverting amplifier circuit 501 and inverting amplifier circuit 502) in the case "with no original being present" (at a sheet-absent-time) involving a small attenuation amount of the ultrasonic wave. Therefore, it is indicated that the amplified waveform is saturated while exceeding the output voltage range of the inverting amplifier circuit 502. That is, in this case, it is not possible to correctly acquire the received wave amplitude.

Further, in the case illustrated in FIG. 6C, the amplification is performed through the circuit having a small amplification factor (inverting amplifier circuit 501) in the case "with original being present" (at a sheet-present-time) involving a large attenuation amount of the ultrasonic wave. Therefore, it is indicated that the amplified waveform has the received wave buried in the background noise (background noise level) due to an insufficient amplification factor. That is, also in this case, it is not possible to correctly acquire the received wave amplitude.

In this manner, when a large amplification factor is applied in the case "with no original being present", the signal is saturated to inhibit a correct amplitude difference from being detected. Meanwhile, when the amplification factor is reduced in the case "with an original being present", the signal is squeezed to inhibit a correct amplitude difference from being detected as well.

In order to solve such a problem, the amplitude of a signal based on a small amplification factor, which is illustrated in FIG. 6A, needs to be detected as the amplitude level in the case "with no original being present", that is, at the sheet-absent-time, which involves a small attenuation amount of the ultrasonic wave. Meanwhile, the amplitude of a signal based on a large amplification factor, which is illustrated in FIG. 6D, needs to be detected as the amplitude level in the case "with an original being present", that is, at a sheet-present-time, which involves a large attenuation amount.

The single feeding or the multi feeding is detected in the case "with an original being present". In addition, the polarity is inverted by an inverting amplifier circuit, but a target to be detected is the amplitude of the received wave, and hence there is no problem.

Figure 7A:
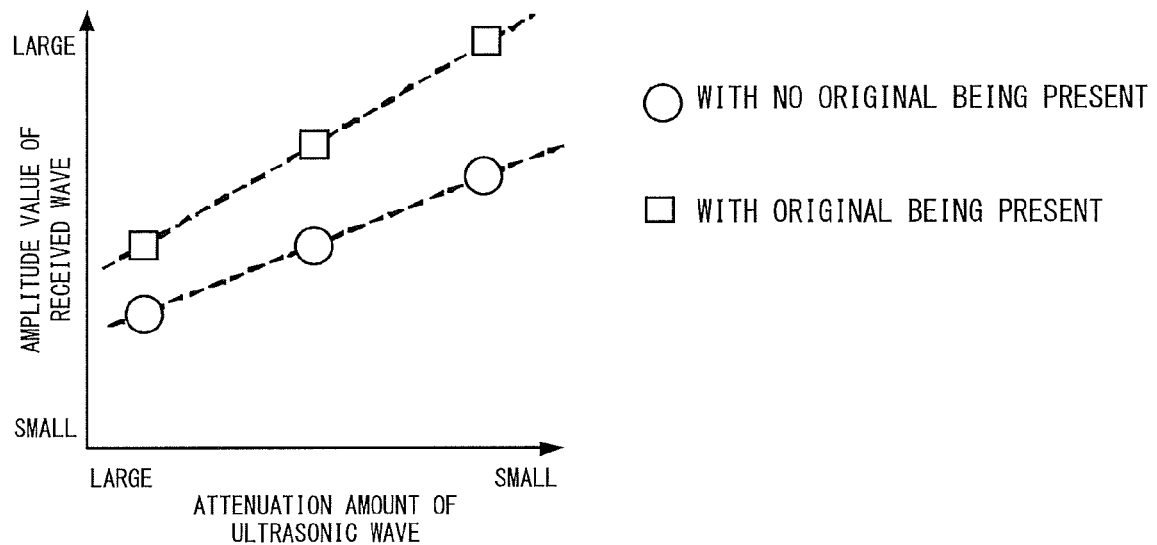
FIG. 7A and FIG. 7B are graphs for showing characteristics of an ultrasonic wave.
Figure 7B:
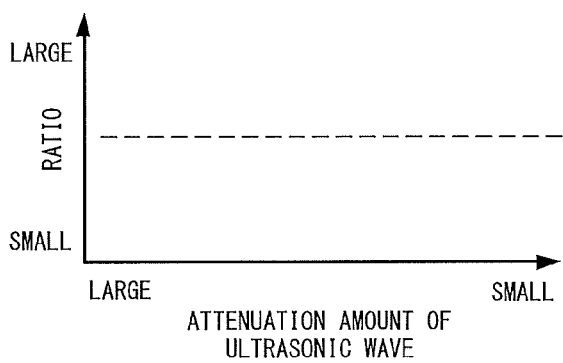

FIG. 7A and FIG. 7B are graphs for showing characteristics of the ultrasonic wave.

As described above, in regard to the received wave of the ultrasonic sensor, the attenuation amount of the ultrasonic wave varies depending on the "variations in sensitivity of the single ultrasonic sensor", the "ambient temperature around the ultrasonic sensor exhibited at the time of the detection", the "relative mechanical positions of the receiving sensor and the transmitting sensor exhibited at the time of the detection", and the like.

In the graph shown in FIG. 7A, the horizontal axis represents the attenuation amount exhibited when the ultrasonic receiving sensor T2 receives the ultrasonic wave transmitted by the ultrasonic transmitting sensor T1, and the vertical axis represents the amplitude value of the received wave.

As shown in FIG. 7A, it is indicated that a received wave amplitude value exhibited "with an original being present" (at the sheet-present-time: □ in FIG. 7A) and a received wave amplitude value exhibited "with no original being present" (at the sheet-absent-time: ○ in FIG. 7A) both become smaller as the attenuation amount of the ultrasonic wave becomes larger. Meanwhile, it is indicated that the received wave amplitude value exhibited "with an original being present" (at the sheet-present-time) and the received wave amplitude value exhibited "with no original being present" (at the sheet-absent-time) both become larger as the attenuation amount of the ultrasonic wave becomes smaller.

In the graph shown in FIG. 7B, the horizontal axis represents the attenuation amount exhibited when the ultrasonic receiving sensor T2 receives the ultrasonic wave transmitted by the ultrasonic transmitting sensor T1. The vertical axis represents a ratio between a received wave amplitude exhibited "with an original being present" (at a single feeding sheet-present-time) and a received wave amplitude exhibited "with no original being present" (at the sheet-absent-time).

As shown in FIG. 7B, it is indicated that the ratio between the received wave amplitudes is substantially constant even when there is a variation in attenuation amount exhibited when the ultrasonic receiving sensor T2 receives the ultrasonic wave transmitted by the ultrasonic transmitting sensor T1.

That is, it is possible to calculate the received wave amplitudes exhibited at the sheet-present-times for the single feeding and the multi feeding with high accuracy by detecting the received wave amplitude exhibited at the sheet-absent-time. Therefore, a threshold value for distinguishing between the "single feeding" and the "multi feeding" can also be determined based thereon. Details thereof are described later.

However, as described above, the received wave includes a "noise from a circuit", an "influence due to vibrations", and other such minute extrinsic noise, which are fixedly generated noise components. Therefore, it is necessary to detect the noise components for each multi feeding detection operation, and to alleviate the influence based on a result of the detection.

The following description is directed to multi feeding detection processing performed by the conveyance apparatus 100 according to the first embodiment.

Figure 8:
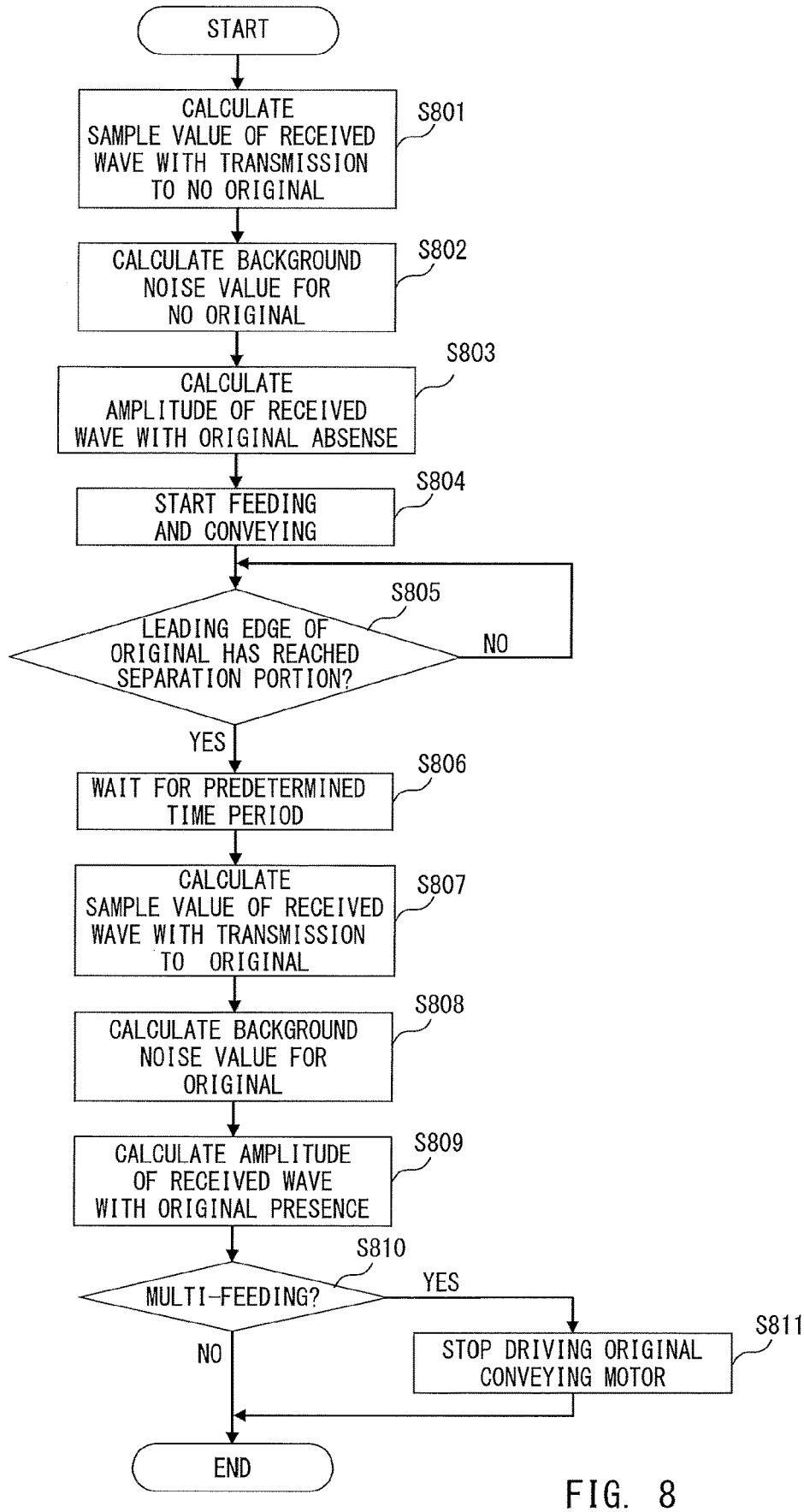
FIG. 8 is a flowchart for illustrating an example of a processing procedure for multi feeding detection processing performed by the conveyance apparatus.

FIG. 8 is a flowchart for illustrating an example of a processing procedure for the multi feeding detection processing performed by the conveyance apparatus 100. Each of the processing steps illustrated in FIG. 8 is executed mainly by the CPU 201.

When receiving an instruction to start reading the original, the CPU 201 outputs a drive signal for transmitting an ultrasonic wave to the ultrasonic drive circuit 203.

The ultrasonic transmitting sensor T1 receives the pulse signal from the ultrasonic drive circuit 203, and transmits the ultrasonic wave toward the ultrasonic receiving sensor T2.

The ultrasonic receiving sensor T2 receives the ultrasonic wave transmitted from the ultrasonic transmitting sensor T1, converts the signal of the received ultrasonic wave into an electric signal, and outputs a result of the conversion to the amplifier circuit 204.

The amplifier circuit 204 amplifies the voltage of the signal received by the ultrasonic receiving sensor T2, and outputs the amplified signal. At this time, a signal output from the inverting amplifier circuit 501 is used.

The A/D converter 503 converts the received signal, which has been amplified, into a digital value based on an A/D conversion start signal output from the CPU 201, and outputs a result of the conversion to the CPU 201.

The CPU 201 samples the received signal based on the result output by the A/D converter 503 and averages results of the sampling to calculate a sample value, and stores a result thereof in the memory 206 as a "sample value of received wave with transmission to no original" (Step S801).

The ultrasonic receiving sensor T2 converts a signal output with no ultrasonic wave being transmitted from the ultrasonic transmitting sensor T1 into an electric signal, and outputs the electric signal to the amplifier circuit 204. The signal output from the ultrasonic receiving sensor T2 with no ultrasonic wave being transmitted from the ultrasonic transmitting sensor T1 is also referred to as the signal received from the ultrasonic receiving sensor T2.

The amplifier circuit 204 amplifies the voltage of the signal received by the ultrasonic receiving sensor T2, and outputs the amplified signal. At this time, the signal output from the inverting amplifier circuit 501 is used.

The A/D converter 503 performs A/D conversion on the received signal, which has been amplified, based on the A/D conversion start signal output from the CPU 201, and outputs a result of the conversion to the CPU 201.

The CPU 201 samples the received signal based on the result output by the A/D converter 503 and averages results of the sampling to calculate a sample value, and stores a result thereof in the memory 206 as a "background noise value for no original" (Step S802).

The CPU 201 calculates an "amplitude of received wave with original absence" based on the "sample value of received wave with transmission to no original" and the "background noise value for no original", which are stored in the memory 206 (Step S803). Specifically, a difference between the maximum value and the minimum value among values each obtained by subtracting the background noise value for no original from the "sample value of received wave with transmission to original" is set as the "amplitude of received wave with no original". Details of the calculation of the amplitude of received wave are described with reference to FIG. 9. A result of the calculation is stored in the memory 206.

The CPU 201 drives the original conveying motor 202 to start feeding and conveying the original 102 (Step S804).

The CPU 201 determines, based on a result of the detection performed by the separation sensor S2, whether or not the leading edge of the original 102 has reached a separation portion (Step S805).

When determining that the leading edge of the original 102 has reached the separation portion (Yes in Step S805), the CPU 201 waits for a predetermined time period until the leading edge of the original 102 reaches a position between the ultrasonic transmitting sensor T1 and the ultrasonic receiving sensor T2 (Step S806). After the waiting time period has elapsed, an original becomes present between the ultrasonic transmitting sensor T1 and the ultrasonic receiving sensor T2.

After the waiting time period has elapsed, that is, in the case "with an original being present" between the ultrasonic transmitting sensor T1 and the ultrasonic receiving sensor T2, the CPU 201 outputs the drive signal for transmitting an ultrasonic wave to the ultrasonic drive circuit 203.

The ultrasonic transmitting sensor T1 receives the pulse signal output by the ultrasonic drive circuit 203, and transmits the ultrasonic wave toward the ultrasonic receiving sensor T2.

The ultrasonic receiving sensor T2 receives the ultrasonic wave transmitted by the ultrasonic transmitting sensor T1, converts the signal of the received ultrasonic wave into an electric signal, and outputs the electric signal to the amplifier circuit 204.

The amplifier circuit 204 amplifies the voltage of the signal received by the ultrasonic receiving sensor T2, and outputs the amplified signal. At this time, a signal output from the inverting amplifier circuit 502 is used.

The A/D converter 504 performs A/D conversion on the received signal, which has been amplified, based on the A/D conversion start signal output from the CPU 201, and outputs a result of the conversion to the CPU 201.

The CPU 201 samples the received signal based on the result output by the A/D converter 504 and averages results of the sampling to calculate a sample value, and stores a result thereof in the memory 206 as a "sample value of received wave with transmission to original" (Step S807).

The ultrasonic receiving sensor T2 converts a signal received with no ultrasonic wave being transmitted from the ultrasonic transmitting sensor T1 into an electric signal, and outputs the electric signal to the amplifier circuit 204.

The amplifier circuit 204 amplifies the voltage of the signal received by the ultrasonic receiving sensor T2, and outputs the amplified signal. At this time, the signal output from the inverting amplifier circuit 502 is used.

The A/D converter 504 converts the received signal, which has been amplified, into a digital value based on the A/D conversion start signal output from the CPU 201, and outputs a result of the conversion to the CPU 201.

The CPU 201 samples the received signal based on the result output by the A/D converter 504 and averages results of the sampling to calculate a sample value, and stores a result thereof in the memory 206 as a "background noise value for no original " (Step S808).

The CPU 201 calculates an "amplitude of received wave with original presence" based on the "sample value of received wave with transmission to original" and the "background noise value for original", which are stored in the memory 206 (Step S809). Specifically, a difference between the maximum value and the minimum value among values each obtained by subtracting the "background noise value for original" from the "sample value of received wave with transmission to original" is set as the "amplitude of received wave with original presence". A result of the calculation is stored in the memory 206.

The CPU 201 compares the value of the calculated "amplitude of received wave with original presence" against the threshold value determined based on the value of the "amplitude of received wave with original absence" to determine based on a result of the comparison whether or not the originals 102 are being conveyed by the multi feeding (Step S810).

Specifically, when the value of the calculated "amplitude of received wave with original presence" exceeds the threshold value, the CPU 201 determines that the original 102 is being conveyed by the "single feeding". Meanwhile, when the value falls below the threshold value, the CPU 201 determines that the original 102 is being conveyed by the "multi feeding". The threshold value for distinguishing between the "multi feeding" and the "single feeding" is derived based on the value of the "amplitude of received wave with original absence". A description is given below of the derivation of the threshold value.

As described above, the ratio between the "amplitude of received wave with original absence" and the "amplitude of received wave with original presence" exhibited when the ultrasonic wave is transmitted through a freely-selected single fed original is substantially constant even when there is a variation in attenuation amount exhibited when the ultrasonic receiving sensor T2 receives the ultrasonic wave transmitted by the ultrasonic transmitting sensor T1. Therefore, a value obtained by multiplying the value of the "amplitude of received wave with original absence" by a freely-selected coefficient is determined as the threshold value for distinguishing between the "multi feeding" and the "single feeding".

Specifically, an original exhibiting the largest attenuation amount of the ultrasonic wave (original exhibiting the smallest amplitude of the received wave) in the single feeding state is identified in advance from among the originals expected to be conveyed in a target apparatus, and a ratio between the "amplitude of received wave with original absence" in that case and the "amplitude of received wave with original presence" at the time of the single feeding of the original is determined. A value obtained by multiplying the ratio by a margin (for example, by about 0.7) is set as the threshold value for distinguishing between the "multi feeding" and the "single feeding".

The threshold value is obtained by multiplying, by the margin, the value of the largest attenuation amount of the ultrasonic wave in the single feeding state among the values exhibited by the originals expected to be conveyed in the apparatus, and hence any original that is being conveyed in the apparatus in the single feeding state does not have the amplitude of the received wave falling below the threshold value.

In addition, when a value obtained by multiplying the value of the largest attenuation amount of the ultrasonic wave in the single feeding state by about 0.7 is determined as the threshold value, the original exhibiting the smallest attenuation amount of the ultrasonic wave (original exhibiting the largest amplitude of the received wave) in the multi fed state does not have the amplitude of the received wave exceeding the threshold value.

This is because a variation in attenuation amount of the ultrasonic wave due to the "multi feeding" or the "single feeding" is larger than a variation in attenuation amount of the ultrasonic wave due to the thickness or kind of the original.

With reference again to FIG. 8, when determining that the originals 102 are being conveyed by the multi feeding (Yes in Step S810), the CPU 201 stops driving the original conveying motor 202 due to a plurality of originals 102 being conveyed in an overlapped state (multi fed state) (Step S811). In this manner, a series of multi feeding detection processing steps is performed.

The threshold value determined based on the amplitude of received wave with original absence may be determined based on a result received by the ultrasonic receiving sensor T2 when a conveyer (original conveying motor 202 or the like) configured to convey the original 102 is in a driven state with the original 102 not having reached the position between the ultrasonic transmitting sensor T1 and the ultrasonic receiving sensor T2.

Figure 9:
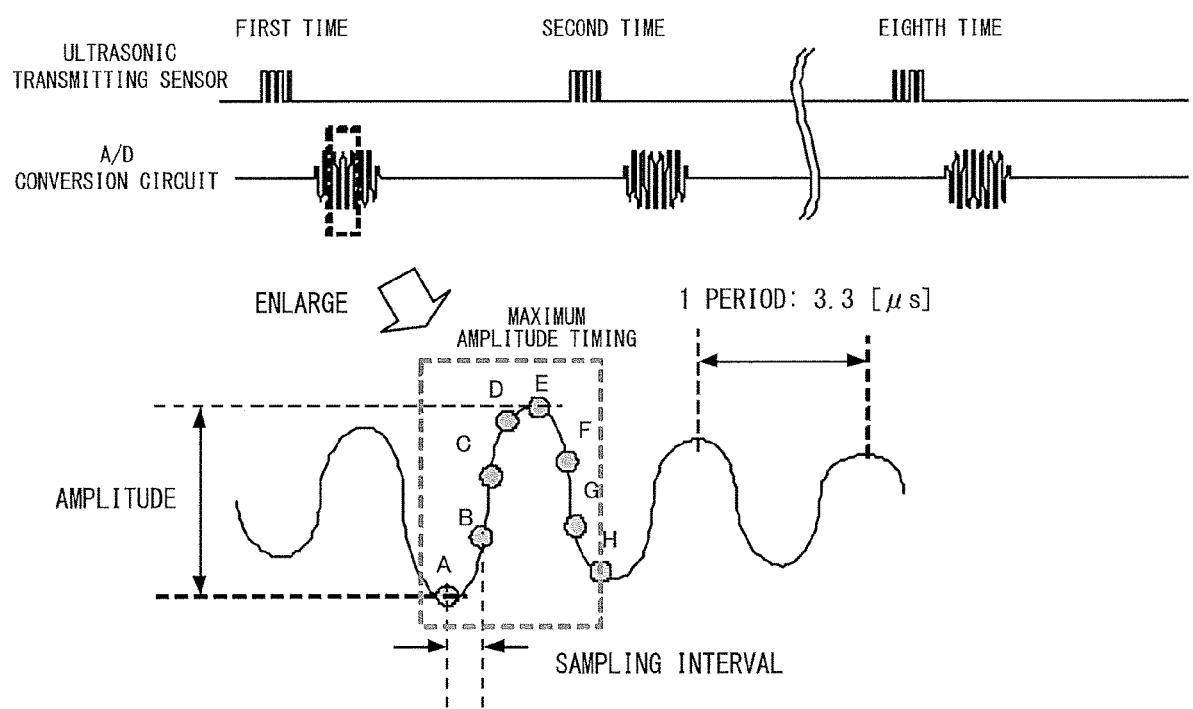
FIG. 9 is a diagram for illustrating an example of a method of calculating an amplitude of an ultrasonic wave received by the ultrasonic receiving sensor.

FIG. 9 is a diagram for illustrating an example of a method of calculating the amplitude of the ultrasonic wave received by the ultrasonic receiving sensor T2.

The ultrasonic receiving sensor T2 receives the ultrasonic wave transmitted from the ultrasonic transmitting sensor T1, converts the signal of the received ultrasonic wave into an electric signal, and outputs the result of the conversion to the amplifier circuit 204.

The amplifier circuit 204 amplifies the voltage of the signal received by the ultrasonic receiving sensor T2, and outputs the amplified signal.

The A/D converter 503 discretely performs the sampling starting from a time point at which the A/D conversion start signal output from the CPU 201 is received, and performs the conversion into the digital value.

As illustrated in FIG. 9, a range for discretely performing the sampling is a period of a received waveform corresponding to freely-selected one period (in the first embodiment, the ultrasonic wave is driven at 300 kHz, and hence one period is 3.3 μs).

A timing (maximum amplitude timing) at which the amplitude of the received wave becomes maximum in the relevant apparatus is used as a timing to output the A/D conversion start signal in this case. The maximum amplitude timing changes depending on the arrangement of the ultrasonic transmitting sensor and the ultrasonic receiving sensor of the apparatus, the temperature, the atmospheric pressure, and the like.

A sampling interval for correctly detecting the amplitude of the received waveform needs to be sufficiently shorter than a drive period of the ultrasonic wave.

For example, in the conveyance apparatus 100 according to the first embodiment, the ultrasonic wave is driven at 300 kHz, and hence one period thereof is 3.3 μs. In order to perform the sampling eight times during the period, the conversion into the digital value is performed at the sampling interval of 0.41 μs.

In this manner, the sampling is performed at an interval sufficiently shorter than the drive period of the ultrasonic wave, and a difference between the minimum value and the maximum value included in results of the sampling is acquired to calculate the amplitude of a freely-selected one of the received waves.

For example, in the case of sample points A to H illustrated in the lower half of FIG. 9, the received wave amplitude is calculated by MAX(A, B, C, D, E, F, G, H)−MIN(A, B, C, D, E, F, G, H). That is, the sample point A exhibits the minimum voltage value, while the sample point E exhibits the maximum voltage value, and hence the received wave amplitude is obtained by subtracting the voltage value of the sample point A from the voltage value of the sample point E.

The output of the ultrasonic receiving sensor T2 is minute with a large amplification factor being applied to the amplifier circuit 204, thereby increasing an influence due to an extrinsic noise. That is, when the received wave amplitude is calculated through use of only a result of the sampling performed one time, it is not possible to calculate a correct amplitude level.

Therefore, it is desired that the ultrasonic receiving sensor be driven a plurality of times (for example, eight times at the timings of A to H in the conveyance apparatus 100) in order to detect the amplitude for one time, and that the amplitude be calculated through use of an average value thereof.

FIG. 10 is a table for showing an example of a method of calculating a voltage value for each of sample points obtained by sampling the received wave a plurality of times (eight times).

In FIG. 10, a value obtained by performing the sampling a plurality of times at the same sampling timing and averaging results of the sampling (for example, A[1] to A[8] for the sample point A) is shown as the above-mentioned "sample value of received wave with transmission to no original" (hereinafter referred to as "A[ave]").

For example, A[ave] is established for the sample point A as follows.

$$A[ave]=(A[1]+A[2]+A[3]+A[4]+A[5]+A[6]+A[7]+A[8])/8$$

Even when the ultrasonic receiving sensor T2 is driven a plurality of times, there are few variations in a time direction. Therefore, an extrinsic noise (variation in an amplitude direction) can be eliminated through the averaging processing. However, only the random noise can be eliminated by the above-mentioned averaging processing, and the fixedly generated noise components cannot be eliminated.

Figure 11:
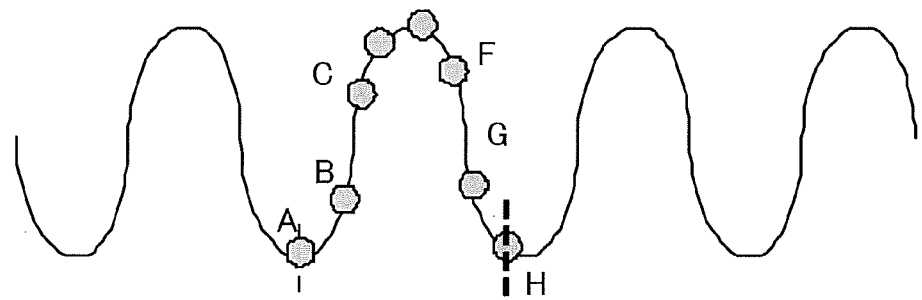
FIG. 11 is a diagram for illustrating a method of sampling a background noise.
Figure 11:
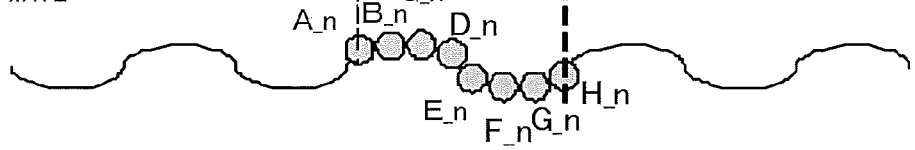

FIG. 11 is a diagram for illustrating a method of sampling the background noise.

The upper portion of FIG. 11 illustrates the waveform received by the ultrasonic receiving sensor T2 in the state involving the transmission of the ultrasonic wave performed by the ultrasonic transmitting sensor T1, and lower portion of FIG. 11 illustrates the waveform output by the ultrasonic receiving sensor T2 in the state involving no transmission of the ultrasonic wave performed by the ultrasonic transmitting sensor T1.

As described above, in regard to the sampling of the background noise, the ultrasonic wave received by the ultrasonic receiving sensor T2 is sampled with the ultrasonic transmitting sensor T1 not being driven.

As illustrated in FIG. 11, the timing for the sampling is determined in the same manner as in the case of the calculation of the "sample value of received wave with transmission to no original" performed with the ultrasonic transmitting sensor T1 being driven. In regard to the averaging processing for the results of the sampling, the averaging is also performed after the sampling is performed the same number of times.

For example, as illustrated in lower portion of FIG. 11, a result of sampling the background noise for the sample point A is set as A_n. Hereinafter, the result of sampling the background noise for the sample point A at a sample number is set as A_n [*] (where * represents the sample number). The "background noise value for no original" is represented by A_n[ave].

In this case, A_n[ave] is obtained as A_n[ave]=(A_n[1]+A_n[2]+A_n[3]+A_n[4]+A_n[5]+A_n[6]+A_n[7]+A_n[8])/8.

A background noise component is corrected by subtracting the "background noise values for no original" (A_n[ave] to H_n[ave]) acquired at the respective sample points from the "sample values of received wave with transmission to no original" (A[ave] to H[ave]) acquired at the respective sample points.

For example, when the "value obtained by subtracting the background noise component" for the sample point A is represented by A_s, A_s=A[ave]−A_n[ave] is established. The other seven points (B to H) are subjected to the same calculation processing.

In this manner, the conveyance apparatus 100 according to the first embodiment is capable of detecting the presence or absence of the multi feeding with higher accuracy by alleviating the influence of the "noise from the circuit", the "influence due to vibrations", and other such minute noise component, which are fixedly generated noise components.

In the conveyance apparatus 100, the amplitude of the received wave is detected after the ultrasonic wave is transmitted with no original being present between the ultrasonic sensor on a transmitting side and the ultrasonic sensor on a receiving side, while the amplitude of the received wave of the receiving sensor is also detected with the ultrasonic wave not being transmitted. In addition, the amplitude of the received wave is detected after the ultrasonic wave is transmitted with an original being present between the ultrasonic sensor on the transmitting side and the ultrasonic sensor on the receiving side, while the amplitude of the received wave of the receiving sensor is also detected with the ultrasonic wave not being transmitted. The threshold value for distinguishing between the "multi feeding" and the "single feeding" is determined based on the results of the detection.

Second Embodiment

The first embodiment is described by taking an exemplary case in which the calculation processing for the "background noise value for no original" is performed after an original is fed.

There is a case in which there is not enough time to detect both the "sample value of received wave with transmission to original" and the "background noise value for original" after an original is fed depending on, for example, a conveyance speed of the original conveyed by the conveyance apparatus or an arrangement relationship between an original feeding portion and each ultrasonic sensor. Specifically, there is a case in which, for example, a time period involved in the conveyance of the original between the two sensors is shorter than a time period required for detecting both the "sample value of received wave with transmission to original" and the "background noise value for original".

A second embodiment of the present invention is described by taking a case in which the calculation processing for the "background noise value for original" is performed with no original being present before the passing of the original, to thereby correct the background noise component.

The same functional components as those of the first embodiment that have already been described are denoted by the same reference symbols, and descriptions thereof are omitted.

Figure 12:
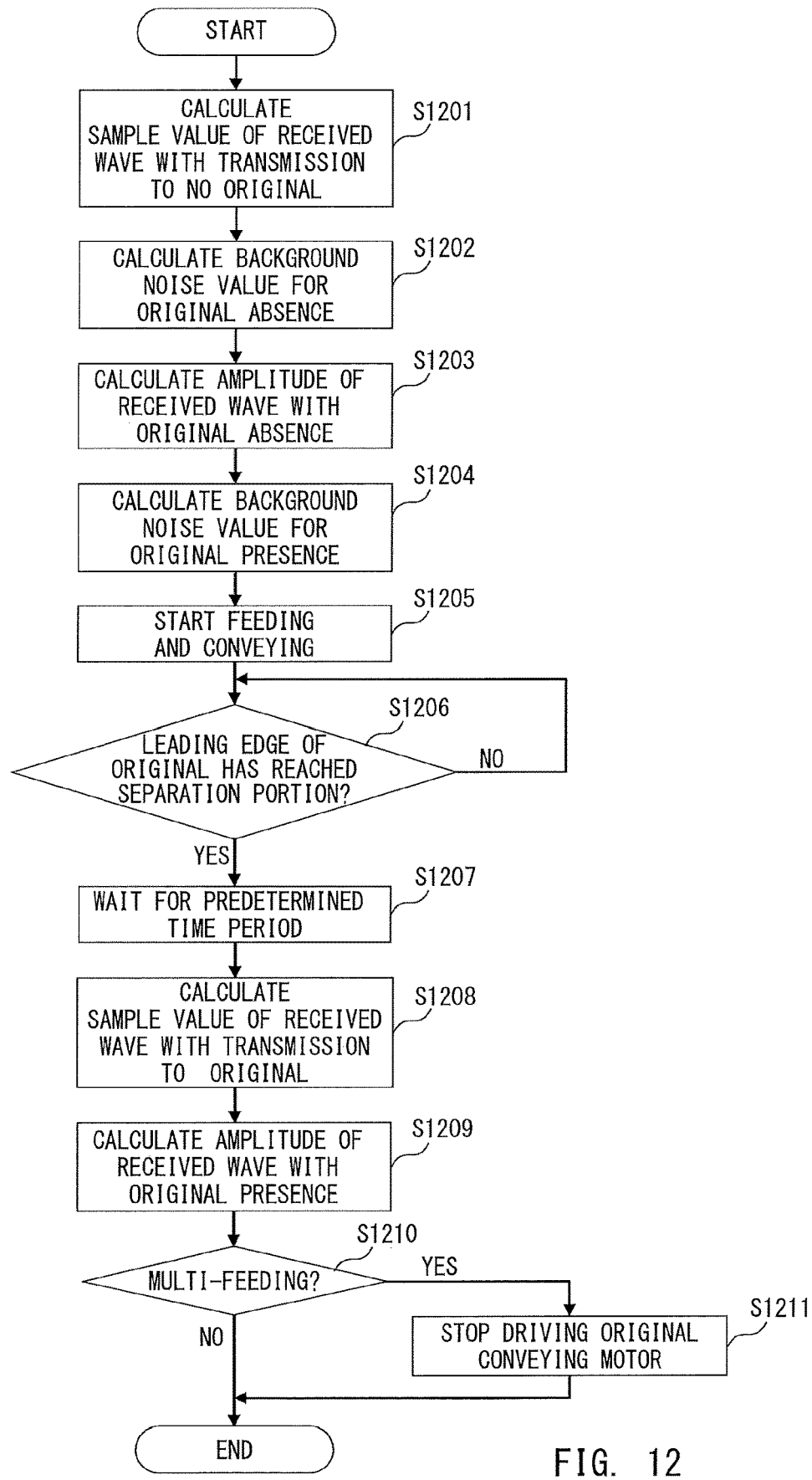
FIG. 12 is a flowchart for illustrating an example of a processing procedure for multi feeding detection processing performed by a conveyance apparatus according to a second embodiment of the present invention.

FIG. 12 is a flowchart for illustrating an example of a processing procedure for multi feeding detection processing performed by the conveyance apparatus according to the second embodiment. Each of the processing steps illustrated in FIG. 12 is executed mainly by the CPU 201.

The processing steps of Step S1201, Step S1202, and Step S1203 illustrated in FIG. 12 are the same as the processing steps of Step S801, Step S802, and Step S803 illustrated in FIG. 8, and hence descriptions thereof are omitted.

The CPU 201 outputs the drive signal for transmitting an ultrasonic wave to the ultrasonic drive circuit 203.

The ultrasonic transmitting sensor T1 receives the pulse signal output by the ultrasonic drive circuit 203, and transmits the ultrasonic wave toward the ultrasonic receiving sensor T2.

The ultrasonic receiving sensor T2 receives the ultrasonic wave transmitted by the ultrasonic transmitting sensor T1, converts the signal of the received ultrasonic wave into an electric signal, and outputs the electric signal to the amplifier circuit 204.

The amplifier circuit 204 amplifies the voltage of the signal received by the ultrasonic receiving sensor T2, and outputs the amplified signal. At this time, the signal output from the inverting amplifier circuit 502 is used.

The A/D converter 504 converts the received signal, which has been amplified, based on the A/D conversion start signal output from the CPU 201, and outputs a result of the conversion to the CPU 201.

The CPU 201 samples the received signal based on an output result of the A/D conversion and averages results of the sampling to calculate a sample value, and stores a result thereof in the memory 206 as the "background noise value for original" (Step S1204).

Methods for the sampling and the calculation involving the "background noise value for original" are the same as those performed in the first embodiment, and hence descriptions thereof are omitted.

The "background noise value for original" calculated in the processing of Step S1204 indicates a background noise level exhibited against a sample obtained by transmitting an ultrasonic wave from the ultrasonic transmitting sensor T1 at the time of the passing of the original, and hence a signal output from the inverting amplifier circuit 502 having a large amplification factor is used as the "background noise value for original".

In this case, the detection of the "background noise value for original" is performed with no original being present between the ultrasonic transmitting sensor T1 and the ultrasonic receiving sensor T2. However, the detection is performed on the output level of the ultrasonic receiving sensor T2 with no ultrasonic wave being transmitted from the ultrasonic transmitting sensor T1, and hence the detection level is not influenced by the presence or absence of an original.

In the case of calculating the "background noise value for original", the original conveying motor 202 is not in a driven state. Therefore, when there has occurred a noise component ascribable to the original conveying motor 202, it is possible to perform the multi feeding detection with higher accuracy at the calculation timing for the "background noise value for original", which is described in the first embodiment. This is because the original conveying motor 202 is in a driven state at the calculation timing for the "background noise value for original", which is described in the first embodiment.

The CPU 201 drives the original conveying motor 202 to start feeding and conveying the original 102 (Step S1205).

The CPU 201 determines based on the result of the detection performed by the separation sensor S2 whether or not the leading edge of the original 102 has reached the separation portion (Step S1206).

When determining that the leading edge of the original 102 has reached the separation portion (Yes in Step S1206), the CPU 201 waits for a predetermined time period until the leading edge of the original 102 reaches the position between the ultrasonic transmitting sensor T1 and the ultrasonic receiving sensor T2 (Step S1207). After the waiting time period has elapsed, an original becomes present on the original conveyance path between the two sensors.

After the waiting time period has elapsed, that is, in the case "with an original being present" between the ultrasonic transmitting sensor T1 and the ultrasonic receiving sensor T2, the CPU 201 outputs the drive signal for transmitting an ultrasonic wave to the ultrasonic drive circuit 203.

The ultrasonic transmitting sensor T1 receives the pulse signal output by the ultrasonic drive circuit 203, and transmits the ultrasonic wave toward the ultrasonic receiving sensor T2.

The ultrasonic receiving sensor T2 receives the ultrasonic wave transmitted from the ultrasonic transmitting sensor T1, converts the signal of the received ultrasonic wave into an electric signal, and outputs a result of the conversion to the amplifier circuit 204.

The amplifier circuit 204 amplifies the voltage of the signal received by the ultrasonic receiving sensor T2, and outputs the amplified signal. At this time, a signal output from the inverting amplifier circuit 502 is used.

The A/D converter 504 converts the received signal, which has been amplified, into a digital value based on an A/D conversion start signal output from the CPU 201, and outputs a result of the conversion to the CPU 201.

The CPU 201 samples the received signal based on the output result of the A/D conversion and averages results of the sampling to calculate a sample value, and stores a result thereof in the memory 206 as a "sample value of received wave with transmission to original" (Step S1208).

The CPU 201 calculates the "amplitude of received wave with original presence" based on the "sample value of received wave with transmission to original" and the "background noise value for original", which are stored in the memory 206 (Step S1209). Results of the calculation are stored in the memory 206.

The CPU 201 determines whether or not the originals 102 are being conveyed by the multi feeding depending on whether or not the value of the calculated "amplitude of received wave with original presence" exceeds the threshold value determined based on the value of the "amplitude of received wave with original absence" (Step S1210).

When determining that the originals 102 are being conveyed by the multi feeding (Yes in Step S1210), the CPU 201 stops driving the original conveying motor 202 due to a plurality of originals 102 being conveyed in an overlapped state (Step S1211). In this manner, a series of multi feeding detection processing steps is performed.

With the above-mentioned multi feeding detection processing, constantly-generated noise components can be corrected even for a configuration in which it is difficult to detect the "background noise value for original" when an original is being conveyed, and it is possible to detect the presence or absence of the multi feeding with higher accuracy.

As described above, according to the present invention, it is possible to detect the presence or absence of the multi feeding with higher accuracy by alleviating the influence of the "noise from the circuit", the "influence due to vibrations", and other such minute noise component, which are fixedly generated noise components.

The embodiments described above are given just for the purpose of describing the present invention more specifically, and the scope of the present invention is not limited by the embodiments.

Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-000875, filed Jan. 6, 2017, which is hereby incorporated by reference herein in its entirety.

What is claimed is:

1. A conveyance apparatus, comprising:
   a conveyer configured to convey a sheet;
   an ultrasonic transmitter, which is arranged at one of positions sandwiching a conveyance path along which the sheet is conveyed, and is configured to transmit an ultrasonic wave toward the conveyance path;
   an ultrasonic receiver, which is arranged at another one of the positions sandwiching the conveyance path, and is configured to receive the ultrasonic wave transmitted from the ultrasonic transmitter; and
   a controller configured to:
   i) obtain a first signal and a second signal, the first signal being a signal corresponding to an output of the ultrasonic receiver in a state without the sheet between the ultrasonic transmitter and the ultrasonic receiver and the ultrasonic wave being transmitted from the ultrasonic transmitter, and the second signal being a signal corresponding to the output of the ultrasonic receiver in a state without the sheet between the ultrasonic transmitter and the ultrasonic receiver and the ultrasonic wave being not transmitted from the ultrasonic transmitter;
   ii) determine a threshold for detecting multi feeding based on a difference between the first signal and the second signal;
   iii) obtain a third signal and a fourth signal, the third signal being a signal corresponding to the output of the ultrasonic receiver in a state with the sheet between the ultrasonic transmitter and the ultrasonic receiver and the ultrasonic wave being not transmitted from the ultrasonic transmitter, and the fourth signal being a signal corresponding to the output of the ultrasonic receiver in a state with the sheet between the ultrasonic transmitter and the ultrasonic receiver and the ultrasonic wave being not transmitted from the ultrasonic transmitter; and
   iv) determine whether or not the sheet is being subjected to multi feeding based on a result of comparison between the threshold and an amplitude value which corresponds to the difference between the third signal and the fourth signal.

2. The conveyance apparatus according to claim 1, further comprising:
a first amplifier configured to amplify the signal received by the ultrasonic receiver; and
a second amplifier configured to amplify the signal received by the ultrasonic receiver with an amplification factor relatively higher than an amplification factor of the first amplifier,
wherein the output of the ultrasonic receiver for obtaining the second signal is amplified by the first amplifier, and the output of the ultrasonic receiver for obtaining the third signal is amplified by the second amplifier.

3. The conveyance apparatus according to claim 2, further comprising:
a first converter configured to convert the received signal, which has been amplified by the first amplifier, into a digital value to output the digital value; and
a second converter configured to convert the received signal, which has been amplified by the second amplifier, into a digital value to output the digital value,
wherein the controller is configured to compare the difference between the third signal and the fourth signal each as a result output by the second converter against the threshold value determined based on the difference between the first signal and the second signal each as a result output by the first converter, and to determine, based on a result of the comparison, whether or not the sheet is being subjected to the multi feeding.

4. A reading apparatus, comprising a reader,
the reader being configured to read an image on a sheet conveyed by a conveyance apparatus,
the conveyance apparatus including:
a conveyer configured to convey the sheet;
an ultrasonic transmitter, which is arranged at one of positions sandwiching a conveyance path along which the sheet is conveyed, and is configured to transmit an ultrasonic wave toward the conveyance path;
an ultrasonic receiver, which is arranged at another one of the positions sandwiching the conveyance path, and is configured to receive the ultrasonic wave transmitted from the ultrasonic transmitter; and
a controller configured to:
  i) obtain a first signal and a second signal, the first signal being a signal corresponding to an output of the ultrasonic receiver in a state without the sheet between the ultrasonic transmitter and the ultrasonic receiver and the ultrasonic wave being transmitted from the ultrasonic transmitter, and the second signal being a signal corresponding to the output of the ultrasonic receiver in a state without the sheet between the ultrasonic transmitter and the ultrasonic receiver and the ultrasonic wave being not transmitted from the ultrasonic transmitter;
  ii) determine a threshold for detecting multi feeding based on a difference between the first signal and the second signal;
  iii) obtain a third signal and a fourth signal, the third signal being a signal corresponding to the output of the ultrasonic receiver in a state with the sheet between the ultrasonic transmitter and the ultrasonic receiver and the ultrasonic wave being not transmitted from the ultrasonic transmitter, and the fourth signal being a signal corresponding to the output of the ultrasonic receiver in a state with the sheet between the ultrasonic transmitter and the ultrasonic receiver and the ultrasonic wave being not transmitted from the ultrasonic transmitter; and
  iv) determine whether or not the sheet is being subjected to multi feeding based on a result of comparison between the threshold and an amplitude value which corresponds to the difference between the third signal and the fourth signal.

5. The reading apparatus according to claim 4, further comprising: a printer configured to print an image on a recording medium based on data read by the reader.

* * * * *